US009222657B2

(12) United States Patent
Ishii

(10) Patent No.: US 9,222,657 B2
(45) Date of Patent: Dec. 29, 2015

(54) VEHICLE LIGHTING DEVICE

(71) Applicant: ICHIKOH INDUSTRIES, LTD., Isehara-shi, Kanagawa-ken (JP)

(72) Inventor: Satoru Ishii, Isehara (JP)

(73) Assignee: ICHIKOH INDUSTRIES, LTD., Isehara-Shi (JP)

( * ) Notice: Subject to any disclaimer, the term of this patent is extended or adjusted under 35 U.S.C. 154(b) by 60 days.

(21) Appl. No.: 13/845,715

(22) Filed: Mar. 18, 2013

(65) Prior Publication Data

US 2013/0257272 A1 Oct. 3, 2013

(30) Foreign Application Priority Data

Mar. 29, 2012 (JP) ................................ 2012-075331

(51) Int. Cl.
*B60L 1/14* (2006.01)
*G05F 1/00* (2006.01)
*H05B 33/08* (2006.01)
*F21V 23/02* (2006.01)

(52) U.S. Cl.
CPC ............ *F21V 23/02* (2013.01); *H05B 33/0815* (2013.01); *H05B 33/0848* (2013.01)

(58) Field of Classification Search
CPC ............... H05B 33/08; H05B 33/0815; H05B 33/0848; B60Q 1/00; B60Q 1/26; G05G 1/00
USPC ......... 315/77, 80, 209 R, 224, 247, 291, 307, 315/308; 323/222, 234, 282, 284, 285, 288
See application file for complete search history.

(56) References Cited

U.S. PATENT DOCUMENTS 8,076,920 B1 12/2011 Melanson
8,339,046 B2 * 12/2012 Kasaba et al. .................. 315/80
8,373,401 B2 2/2013 Kasaba et al.
2009/0230888 A1 * 9/2009 Fujii et al. ..................... 315/307
2010/0208502 A1 * 8/2010 Horii ............................ 363/131
2010/0219764 A1 9/2010 Yamasaki et al.
2011/0062870 A1 * 3/2011 Kanbara ........................ 315/77
2011/0121757 A1 5/2011 Welten
2011/0198998 A1 8/2011 Kasaba et al.

FOREIGN PATENT DOCUMENTS

JP 2011-172321 A 9/2011

* cited by examiner

*Primary Examiner* — Thai Pham
(74) *Attorney, Agent, or Firm* — Foley & Lardner LLP

(57) ABSTRACT

The present invention provides a vehicle lighting device that can set a wide output current without replacing a component such as a coli. An output current setting device 7 sets an output current setting signal 8 in such a manner that an output current 5 in accordance with a luminous flux of an LED 2 is outputted. The output current setting signal 8 is supplied to a frequency adjusting component 3*a* and an output current detecting component 3*b*. The frequency adjusting component 3*a* generates a triangle wave of a frequency based upon the output current setting signal 8, and supplies the triangle wave to an output adjusting-signal generating component 3*c*. The output adjusting-signal generating component 3*c* compares the triangle wave with a signal voltage that is outputted from the output current detecting component 3*b* to generate an output adjusting signal 6, which is supplied to a switching element 30.

6 Claims, 8 Drawing Sheets

FIG. 3

| Rbin setting example | Bin determination circuit 11 | Frequency adjusting component 3a | | | | Output current detecting component 3b | | | |
|---|---|---|---|---|---|---|---|---|---|
| Resistance value | Input | Setting of 12a and 12b | | Frequency | Combined resistor 41 (ra•rb•rc) | Setting of 12a and 12b | | Setting current | Combined resistor 42 (Ra•Rb•Rc) |
| | Voltage of 8 | 13a | 13b | | | 14a | 14b | | |
| 10kΩ Large | 3.4V Large | OFF | OFF | 300kHz Low | 150kΩ Large | ON | ON | 1.0A Large | 11.9kΩ Small |
| 4.7kΩ Middle | 2.5V Middle | ON | OFF | 400kHz Middle | 114kΩ Middle | ON | OFF | 0.8A Middle | 15.1kΩ Middle |
| 1kΩ Small | 0.88V Small | ON | ON | 500kHz High | 92kΩ Small | OFF | OFF | 0.6A Small | 20kΩ Large |

VEHICLE LIGHTING DEVICE

CROSS REFERENCE TO RELATED APPLICATIONS

This application claims priority of Japanese Patent Application No. 2012-075331 filed on Mar. 29, 2012. The contents of the application are incorporated herein by reference in their entirety.

BACKGROUND OF THE INVENTION

1. Field of the Invention

The present invention relates to a vehicle lighting device, and in particular, to a vehicle lighting device in which a light emitting element is employed as a light source.

2. Description of the Related Art

Conventionally a load that is operable by a current, for example, a light emitting element such as an LED (Light Emitting Diode) having a feature that a luminous intensity of light changes depending on a value of a current is employed as a light source of a vehicle lighting device. The vehicle lighting device with such a load has a function that a current flowing in the load is detected, which is converted to a voltage, and the current flowing in the load is controlled to be constant based upon this voltage. An explanation will be made of a conventional example of the vehicle lighting device having such a function with reference to FIG. 5 to FIG. 8.

A conventional, basic vehicle lighting device depicted in FIG. 5 comprises a power conversion component 1, an LED 2 and an output control component 3, and an example of a vehicle lighting device shown in FIG. 6 further comprises an output current setting device 7 in addition to these components. The power conversion component 1 converts a direct-current power that is supplied through an input terminal +V and a ground terminal GND, and supplies an output current 5 that is outputted by the conversion to the LED 2. In addition, the power conversion component 1 detects the output current 5, and outputs an output current signal 4 based upon this detection.

The LED 2 emits a luminous flux that is set from a plurality of ranks in accordance with a plurality of predetermined luminous fluxes. The output current 5 of the set current is supplied to the LED 2 in such a manner as to emit the above set luminous flux. The output current setting device 7 depicted in FIG. 6 outputs a set output current setting signal 8 to the output control component 3. That is, the output current setting device 7 outputs the output current setting signal 8 to the output control component 3 such that the output current 5 becomes the above set current and the LEI) 2 emits the set luminous flux.

The output control component 3 comprises a frequency generating component 3*a*, an output current detecting component 3*b*, and an output adjusting-signal generating component 3*c*. The frequency generating component 3*a* generates a frequency signal of a predetermined, fixed frequency, for example, a triangle wave.

The output current signal 4 and the output current setting signal 8 are inputted to the output current detecting component 3*b*, which sets a reference voltage as a reference value by using the output current setting signal 8. The output current detecting component 3*b* compares the reference voltage with the output current signal 4 to output a signal voltage. In addition, the above triangle wave and signal voltage are inputted to the output adjusting-signal generating component 3*c*, which compares them for adjustment to output an output adjusting signal 6 to the power conversion component 1.

With reference to FIG. 7 and FIG. 8, an explanation will be further made of the control of the output control component 3, FIG. 7 is a timing chart depicting generation of the output adjusting signal 6. An upper part of the figure depicts the triangle wave that is outputted from the frequency generating component 3*a* and the signal voltage that is outputted from the output current detecting component 3*b*. A lower part of the figure depicts the output adjusting signal 6 that is formed by adjusting the triangle wave and the signal voltage to be outputted in the output adjusting-signal generating component 3*c*.

That is, the output adjusting-signal generating component 3*c*, when the output of the triangle wave exceeds the output of the adjusted output current signal, outputs the output adjusting signal 6 of Hi, and on the other hand, when the output of the triangle wave does not exceed the output of the signal voltage, outputs the output adjusting signal 6 of Low.

This output adjusting-signal generating component 3*c* functions in such a manner that, for example, in a case where the output current 5 is reduced to a value lower than a current defined for driving the LED 2, the output current signal 4 is compared with a reference voltage to be adjusted to be equal to the reference voltage. In this case, a ratio of the output adjusting signal 6 of Hi increases, and the output current 5 returns to the defined current. In addition, in a case where the output current 5 is increased to a value higher than the defined current, the output current signal 4 is compared with the reference voltage to be adjusted to be equal to the reference voltage. In this case, a ratio of the output adjusting signal 6 of Hi decreases, and the output current 5 returns to the defined current. It should be noted that the output adjusting-signal generating component 3*c* employs a circuit such as a comparator or a flip flop. In addition, a modulation method, for example, a pulse width modulation (PWM) is applied to the signal of the output adjusting signal 6.

FIG. 8(*a*) is a block circuit diagram of the power conversion component 1. As depicted in the figure, the power conversion component 1 has a predetermined, fixed inductance, and comprises a coil 20 in which a coil current IL flows, a switching element 30 such as a MosFET that converts power by a switching operation, an output detecting resistor 40 that is used for detection of the output current signal 4, an output detecting component 40*a* that amplifies the detected current to be outputted as the output current signal 4, a condenser 50, and a diode 60. The output adjusting signal 6 drives the switching element 30 in such a manner as to supply the set output current 5 to the LED 2. It should be noted that the power conversion component 1 comprising these components is a general pressure-increasing DC-DC converter, and the detailed explanation is omitted.

Next, an explanation will be made of FIG. 8(*b*). An upper part of the figure depicts a timing chart of Hi and Low as output of the output adjusting signal 6 depicted also in FIG. 7. A middle part of the figure depicts a timing chart of a value of the coil current IL flowing in the coil 20 in a case where the output current 5 is set as large. A lower part of the figure depicts a timing chart of a value of the coil current IL flowing in the coil 20 in a case where the output current 5 is set as small.

As depicted in FIG. 8(*b*), when the output adjusting signal 6 is Hi, the switching element is driven and the coil current IL flows to increase in the coil 20. That is, the coil current IL flows to increase when the output adjusting signal 6 is Hi and flows to decrease when the output adjusting signal 6 is Low. An inclination of the increase or decrease of the coil current IL is constant because the inductance as a constant of the coil 20 is fixed. Even if the inclination of the increase or decrease of the coil current IL is thus constant, in a case where the output current is set as large, the coil current IL is also large, and, as depicted in the middle part of FIG. 8(*b*), the coil current IL is not reduced to less than 0 A. In this case, the output current 5 is stably supplied to the LED 2. It should be noted that the inductance of the coil 20 is generally set to be stable when the output current is set as the maximum.

On the other hand, in a case where the output current is set as small, the coil current IL is also small, and, as depicted in the lower part of FIG. 8(*b*), the coil current IL is reduced to less than 0 A. In this case, the output current 5 becomes unstable, and therefore the unstable current is supplied to the LED 2. This is because, as described above, the frequency from the frequency generating component 3*a* is fixed and the frequency of the output adjusting signal 6 that drives the switching element 30 is fixed.

Japanese Unexamined Patent Application Publication No. 2011-172321 discloses a technology in regard to a vehicle lighting device provided with a pressure-increase/decrease DC-DC converter that increases or decreases an inputted direct-current voltage to be converted to an output voltage. The pressure-increase/decrease DC-DC converter comprises a pressure-increasing switch, a pressure-decreasing switch, a coil, and a control component.

The control component comprises a comparator component that compares an output value and a predetermined target value to output the comparison result, a triangle wave generating component that generates a triangle wave, and a drive pulse generating circuit that generates pulses for driving the pressure-increasing switch and the pressure-decreasing switch. The pulse is generated by inputting the calculation output voltage from the comparator component and the triangle wave from the triangle wave generating component to a comparator. That is, the drive pulse generating circuit outputs a low level signal in a case where a voltage value of the calculation output voltage is equal to or more than a voltage value of the triangle wave, and on the other hand, outputs a high level signal in a case where the voltage value of the calculation output voltage is less than the voltage value of the triangle wave.

In the conventional vehicle lighting device, in a case where a light emitting element that is employed as a load is an LED, a luminous flux thereof varies, and it is necessary to suppress the variation of the luminous flux. Therefore adjustment of the luminous flux, that is, a change in the current that is supplied to the LED is made, thus coping with the variation of the luminous flux. In addition, the LED is classified into a plurality of ranks corresponding to values of the luminous flux, and the current is set in accordance with the rank.

In the above conventional vehicle lighting device, the output current is changed by changing the setting of the resistance value or the reference voltage corresponding to each rank. However, the setting (duty) of ON or OFF for power control does not almost change in the set output current because of the current forward voltage characteristics of the LED. Accordingly the set output current requires a large width for being adapted to each rank of the vehicle lighting device.

In a case where the output current requires such a large width, a component such as a coli is set to be adapted to the maximum current value. Therefore there is a problem that when the set output current is low, the output current can not be maintained. This is the problem that, as explained with reference to FIG. 8(*b*), in a case where the output voltage does not almost change, that is, in a case where the duty does not change, the output current decreases, and therefore the limit value of the current flowing the coil is reduced to less than 0 A.

In this state, it is not possible to maintain the stable output current. In addition, in this state, it is required to change a constant of the circuit, for example, replace a component of the coil or the like for each set output current, or employ the circuit only in a narrow range of the output current in which the circuit can be adapted.

The vehicle lighting device provided with the pressure-increasing/decreasing DC-DC converter that is described in Japanese Unexamined Patent Application Publication No. 2011-172321, as described above, includes the drive pulse generating circuit in which the calculation output voltage from the comparator component and the triangle wave from the triangle wave generating component are inputted to the comparator to generate a drive pulse. However, the invention that is described in Japanese Unexamined Patent Application Publication No. 2011-172321 is designed to control the output voltage to be kept constant to the variation in input voltage, and is not configured to solve the foregoing problems.

SUMMARY OF THE INVENTION

The present invention is proposed for solving the problems in the foregoing conventional technology. That is, the present invention has an object of providing a vehicle lighting device that is capable of setting a wide output current without replacement of a component such as a coil.

In order to achieve the above object, the present invention is achieved by the following configuration.

A vehicle lighting device according to first aspect of present invention, comprising:

a load that is operable by a current;

a power conversion component configured to convert a direct-current power that is inputted and supply the converted output current for output to the load, and to output an output current signal based upon the output current;

an output current setting device that outputs a set output current setting signal;

a frequency adjusting component configured to output a frequency signal of a frequency based upon the output current setting signal that is inputted;

an output current detecting component configured to compare a reference voltage based upon a voltage generated and the output current signal, employing the output current setting signal that is inputted, and to output a signal voltage;

an output adjusting-signal generating component configured to compare the frequency signal and the signal voltage that are inputted, and to output an output adjusting signal; and an output control component configured to supply the output adjusting signal to the power conversion component.

The vehicle lighting device according to second aspect of the present invention, wherein the load includes a light emitting element that emits a luminous flux that is set from a plurality of ranks in accordance with a plurality of predetermined luminous fluxes, the power conversion component includes; a coil having a predetermined inductance, and a switching element that changes a coil current flowing in the coil by a switching operation to be converted to the output current, the output current setting device sets the output current setting signal to correspond to the set luminous flux, the frequency adjusting component outputs a frequency signal of a frequency based upon the output current setting signal in accordance with the set luminous flux, the output current detecting component configured to set the reference voltage employing the output current setting signal in accordance with the set luminous flux, and to compare the reference voltage with the output current signal, and to output a signal voltage, and the output adjusting-signal generating component configured to compare the frequency signal with the signal voltage, and to output the output adjusting signal, and to drive the switching element in such a manner that the output adjusting signal outputs the output current in accordance with the light emitting element, The vehicle lighting device according to third aspect of the present invention, wherein, in the first aspect, the frequency signal includes a triangle wave.

Further, the vehicle lighting device according to fourth aspect of the present invention, wherein in the second aspect, the frequency adjusting component sets a low frequency in a case where the output current is set as large, and on the other hand, sets a high frequency in a case where the output current is set as small.

Furthermore, the vehicle lighting device according to fifth aspect of the present invention, wherein, in the fourth aspect, the frequency adjusting signal drives the switching element in such a manner that the coil current is not reduced to less than 0 A in a case where the output current is set as small.

Moreover, the vehicle lighting device according to sixth aspect of the present invention, wherein in the second aspect, the light emitting element includes an LED.

As explained above, according to the vehicle lighting device in the present invention, also in the configuration that employs the power conversion component of the non-insulating power source configuration with the aim of simplification of the circuit, a cycle of the switching element can be adjusted to the output current setting signal in accordance with the load information. That is, according to the configuration of the present invention, not only the determination of the output setting current but also at the same time, the determination of the output frequency can be made in the output control component. In this way the vehicle lighting device in the present invention adjusts the cycle of the switching whereby the current flowing in the coil can not be reduced to less than 0 A also in a case where the output current is set as low, thus enabling the stable output current to be supplied. In addition, the vehicle lighting device in the present invention can realize the simplification of a component setting specification and of management of components, and further can reduce component costs, finished product costs and the like.

BRIEF DESCRIPTION OF THE DRAWINGS

FIG. 3 is a table that indicates a setting for each rank of the vehicle lighting device according to the embodiment.

DESCRIPTION OF THE PREFERRED EMBODIMENTS

Figure 1:
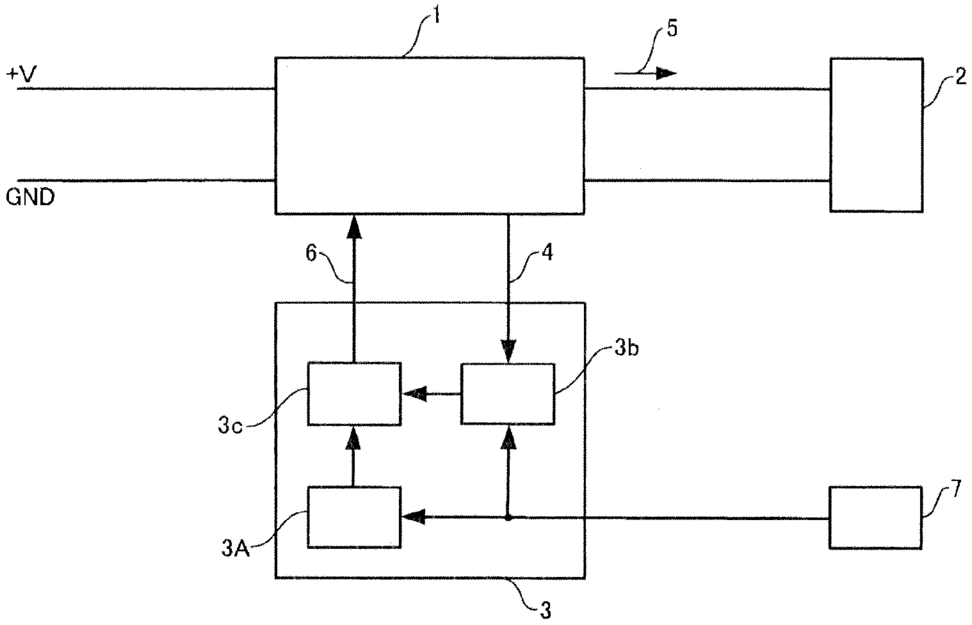
FIG. 1 is a block diagram that depicts a vehicle lighting device according to an embodiment.

Hereinafter, an explanation will be in detail made of preferred embodiments (hereinafter referred to as embodiments) for carrying out a vehicle lighting device according to the present invention with reference to FIG. 1 to FIG. 4. It should be noted that identical components are designated by identical reference numerals throughout the description of the embodiment. The detailed explanation of the configuration and the contents that are already explained in the conventional vehicle lighting device is omitted.

FIG. 1 is a block diagram that depicts an embodiment. As depicted in FIG. 1, the vehicle lighting device according to the embodiment comprises a power conversion component 1, an LED 2, an output control component 3, and an output current setting device 7, and the output control component 3 comprises a frequency adjusting component 3*a*, an output current detecting component 3*b*, and an output adjusting-signal generating component 3*c*. An output current signal 4 is a signal that is supplied to the output current detecting component 3*b* from the power conversion component 1. An output current 5 is a current that a direct-current power source inputted to the power conversion component 1 is converted therein, and that is then supplied to the LED 2. An output adjusting signal 6 is a signal that is supplied to the power conversion component 1 from the output adjusting-signal generating component 3*c*.

An output current setting signal 8 is a signal that is supplied to the frequency adjusting component 3*a* and the output current detecting component 3*b* from the output current setting device 7. The output current setting signal 8 outputs a signal that is set in such a manner that the output current 5 becomes the set current. The frequency adjusting component 3*a* to which the set output current setting signal 8 is inputted and that generates a frequency signal of the frequency that is set based upon the output current setting signal 8, that is, a triangle wave, and supplies the triangle wave to the output adjusting-signal generating component 3*c*.

The output adjusting-signal generating component 3*c* compares the triangle wave of the above set frequency with the signal voltage that is outputted from the output current detecting component 3*b* for adjustment, and generates the output adjusting signal 6 of the frequency in accordance with the set frequency.

Figure 2:
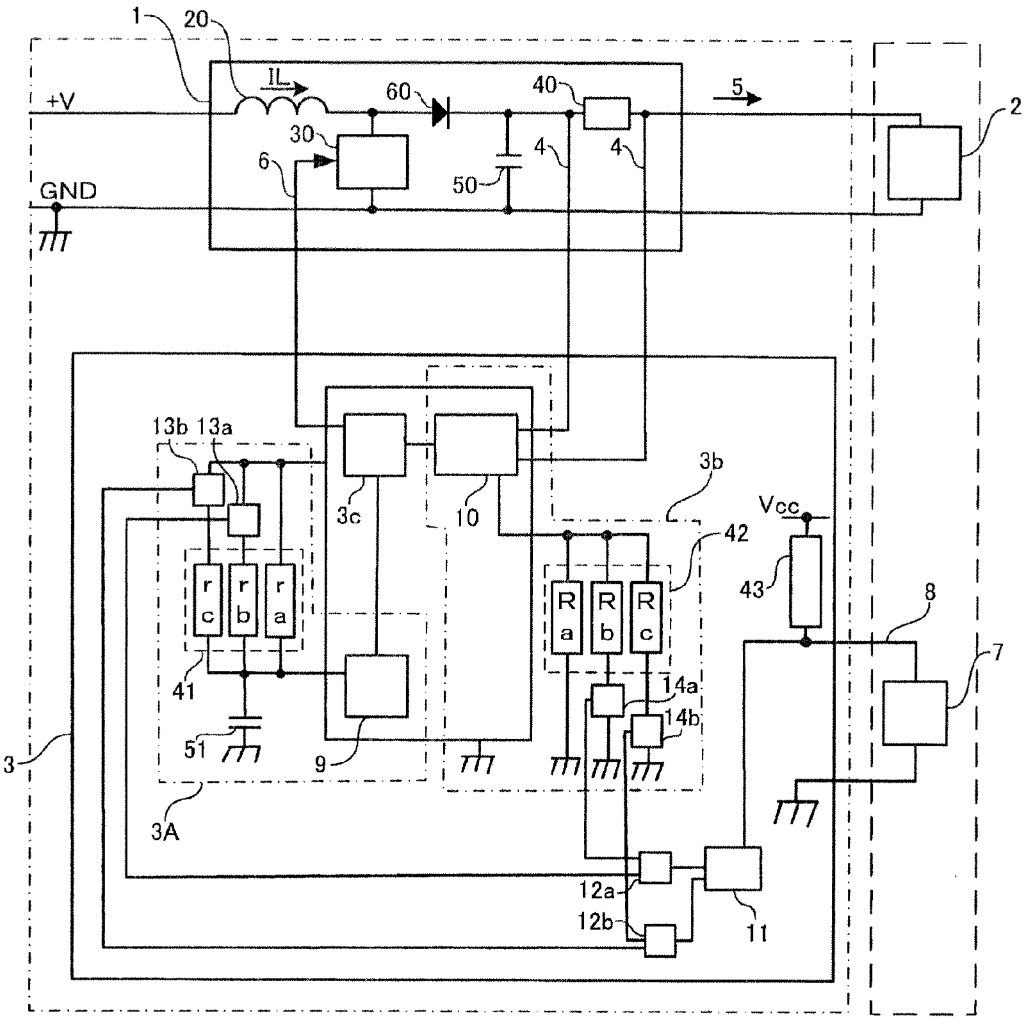
FIG. 2 is a block circuit diagram that depicts the vehicle lighting device according to the embodiment.
Figure 8:
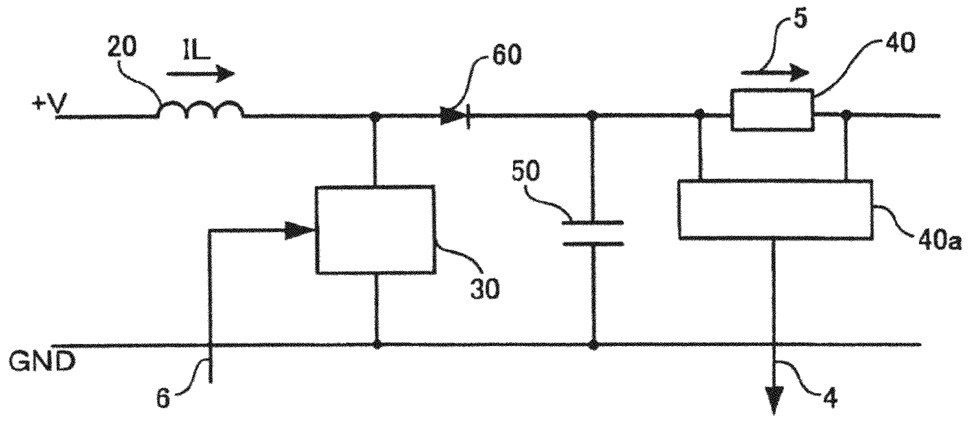
FIG. 8 (a) PRIOR ART
FIG. 8 is a block circuit diagram (a) that depicts a conventional power conversion component and a timing chart (b) that depicts generation of a coil current thereof.
Figure 8:
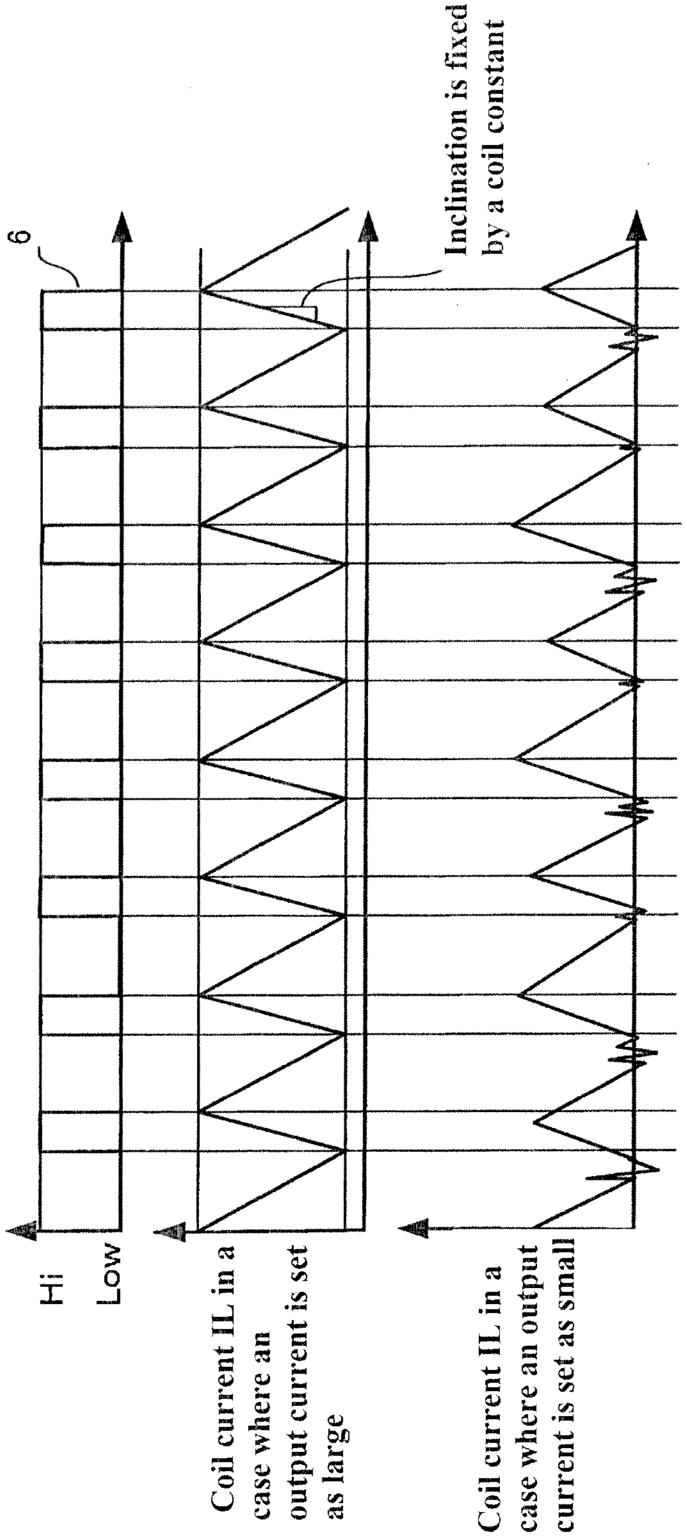

An explanation will further made of the embodiment with reference to FIG. 2 and FIG. 3. FIG. 2 is a block circuit diagram that depicts the embodiment. FIG. 3 is a table that indicates the setting for each rank of the embodiment. The power conversion component 1 that is depicted in FIG. 2 is similar to the pressure-increasing DC-DC converter that is explained with reference to FIG. 8(*a*), and the detailed explanation thereof is omitted.

In the embodiment, the rank of the LED 2 is classified into large, middle and small categories for descriptive purposes, and as depicted in FIG. 3, the output current 5 (set current depicted in the figure) is set as 1.0 A at the time of the large rank, as 0.8 A at the time of the middle rank, and as 0.6 A at the time of the small rank. That is, the LED 2 in which the luminous flux is defined as the large rank is driven by 1.0 A of the current, the LED 2 in which the luminous flux is defined as the middle rank is driven by 0.8 A of the current, and the LED 2 in which the luminous flux is defined as the small rank is driven by 0.6 A of the current. It should be noted that the classification of the rank is indicated only as an example, and is not limited thereto.

The output current setting device 7 has a resistor in accordance with the each rank. The respective resistors in accordance with the respective ranks comprise, as depicted in FIG. 3, a resistor of a resistance value of 10 kΩ that is set at the time of the large rank, a resistor of a resistance value of 4.7 kΩ that is set at the time of the middle rank, and a resistor of a resistance value of 1 kΩ that is set at the time of the small rank.

The output current setting device 7 is configured to divide a voltage from a constant voltage source Vcc (5V in this example) by a voltage dividing resistor 43 (4.7 kΩ in this example) and the above set resistor, and to supply the divided voltage to a Bin determination circuit 11. That is, the voltage of the output current setting signal 8 is the divided voltage, and as depicted in FIG. 3, is 3.4V at the time of the large rank, 2.5V at the time of the middle rank, and 0.88V at the time of the small rank.

The Bin determination circuit 11 compares the output current setting signal 8 that is inputted to the Bin determination circuit 11 by using the setting voltage range based upon each rank to output a signal in such a manner that each of switch changing components 12*a* and 12*b* determines ON or OFF. The switch changing component 12*a* outputs a signal in such a manner that each of a frequency changing switch 13*a* and a setting current changing switch 14*a* determines ON or OFF in response to a signal from the Bin determination circuit 11. The switch changing component 12*b* outputs a signal in such a manner that each of a frequency changing switch 13*b* and a setting current changing switch 14*b* determines ON or OFF in response to a signal from the Bin determination circuit 11. It should be noted that each of these switches comprises a relay, a P-type FET, a pnp transistor or the like.

The frequency changing switches 13*a* and 13*b* change resistance values of a combined resistor 41 in response to signals from the switch changing components 12*a* and 12*b*. The combined resistor 41 is, as depicted in FIG. 2, configured such that a resistor ra, a resistor rb and a resistor rc are connected in parallel. The changing of the resistance value of the combined resistor 41 is, as depicted in FIG. 2 and FIG. 3, performed in such a manner that, at the time of the large rank, the frequency changing switch 13*a* is OFF by a signal from the switch changing component 12*a*, and the frequency changing switch 13*b* is OFF by a signal from the switch changing component 12*b*. The combined resistor 41 at this time is only the resistor ra, and is 150 kΩ (large).

At the time of the middle rank, the frequency changing switch 13*a* is ON by a signal from the switch changing component 12*a*, and the frequency changing switch 13*b* is OFF by a signal from the switch changing component 12*b*. The combined resistor 41 at this time is the resistor ra and the resistor rb, and is 114 kΩ (middle). In addition, at the time of the small rank, the frequency changing switch 13*a* is ON by a signal from the switch changing component 12*a*, and the frequency changing switch 13*b* is ON by a signal from the switch changing component 12*b*. The combined resistor 41 at this time is the resistor ra, the resistor, rb and the resistor rc, and is 92 kΩ (small).

The combined resistor 41 is thus set in accordance with the rank, and a triangle wave generator 9 generates a triangle wave of the frequency set by the combined resistor 41 and discharge and charge of the condenser 51 in response to this setting. That is, as depicted in FIG. 3, these set frequencies are 300 kHz (low) at the time of the large rank, 400 kHz (middle) at the time of the middle rank, and 500 kHz (high) at the time of the small rank. The triangle wave that is generated in the triangle wave generator 9 is outputted to the output adjusting-signal generating component 3*c*.

On the other hand, setting current changing switches 14*a* and 14*b* change a resistance value of the combined resistor 42 in response to signals from the switch changing components 12*a* and 12*b*. The combined resistor 42 is, as depicted in FIG. 2, configured such that a resistor Ra, a resistor Rb and a resistor Rc are connected in parallel. The changing of the resistance value of the combined resistor 42 is, as depicted in FIG. 2 and FIG. 3, performed in such a manner that, at the time of the large rank, the setting current changing switch 14*a* is ON by a signal from the switch changing component 12*a*, and the setting current changing switch 14*b* is ON by a signal from the switch changing component 12*b*. The combined resistor 42 at this time is the resistor Ra, the resistor Rb and the resistor Rc, and is 11.9 kΩ (small).

At the time of the middle rank, the setting current changing switch 14*a* is ON by a signal from the switch changing component 12*a*, and the setting current changing switch 14*b* is OFF by a signal from the switch changing component 12*b*. The combined resistor 42 at this time is the resistor Ra and the resistor Rb, and is 15.1 kΩ (middle). In addition, at the time of the small rank, the setting current changing switch 14*a* is OFF by a signal from the switch changing component 12*a*, and the setting current changing switch 14*b* is OFF by a signal from the switch changing component 12*b*. The combined resistor 42 at this time is only the resistor Ra, and is 20 kΩ (large).

The combined resistor 42 is thus set in accordance with the rank, and an output current determining/setting component 10 supplies a current in accordance with the output current signal 4 to the combined resistor 42 in response to the setting, and the generated voltage is compared with a reference voltage that is provided for each rank to adjust the output voltage. The output current determining/setting component 10, at the time the combined resistor 42 is large, that is, at the time of the small rank, outputs a signal voltage in accordance with the small rank to the output adjusting-signal generating component 3*c*, by such adjustment. In addition, the output current determining/setting component 10, at the time the combined resistor 42 is middle, that is, at the time of the middle rank, outputs a signal voltage in accordance with the middle rank to the output adjusting-signal generating component 3*c*. Further, the output current determining/setting component 10, at the time the combined resistor 42 is small, that is, at the time of the large rank, outputs a signal voltage in accordance with the large rank to the output adjusting-signal generating component 3*c*.

As described above, the triangle wave and the signal voltage that are adjusted in accordance with each rank are inputted to the output adjusting-signal generating component 3*c*, which compares them for adjustment to output the output adjusting signal 6. The output adjusting signal 6 drives a switching element 30 such that the output current 5 in accordance with each rank is supplied to the LED 2.

Figure 4:
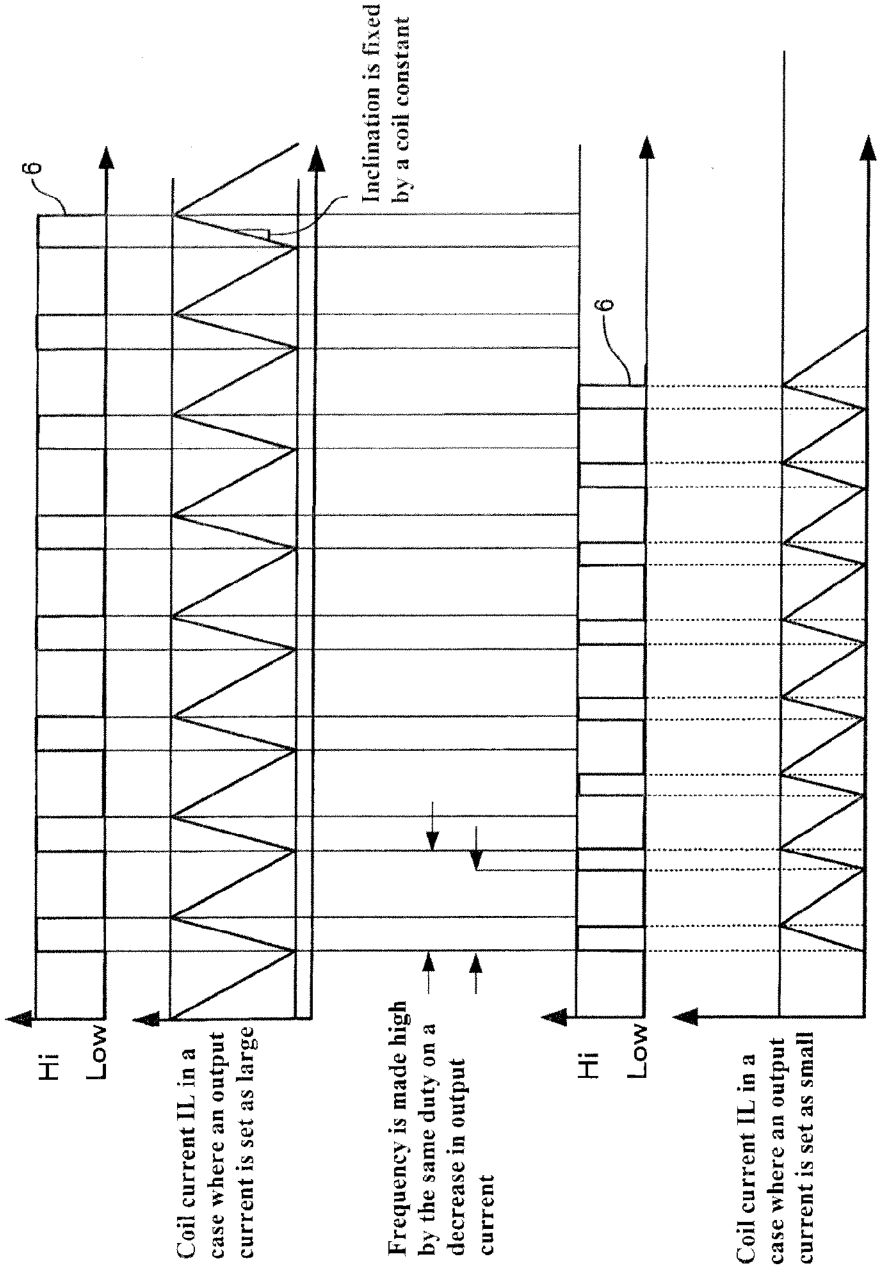
FIG. 4 is a timing chart that depicts generation of a coil current in the embodiment.
Figure 5:
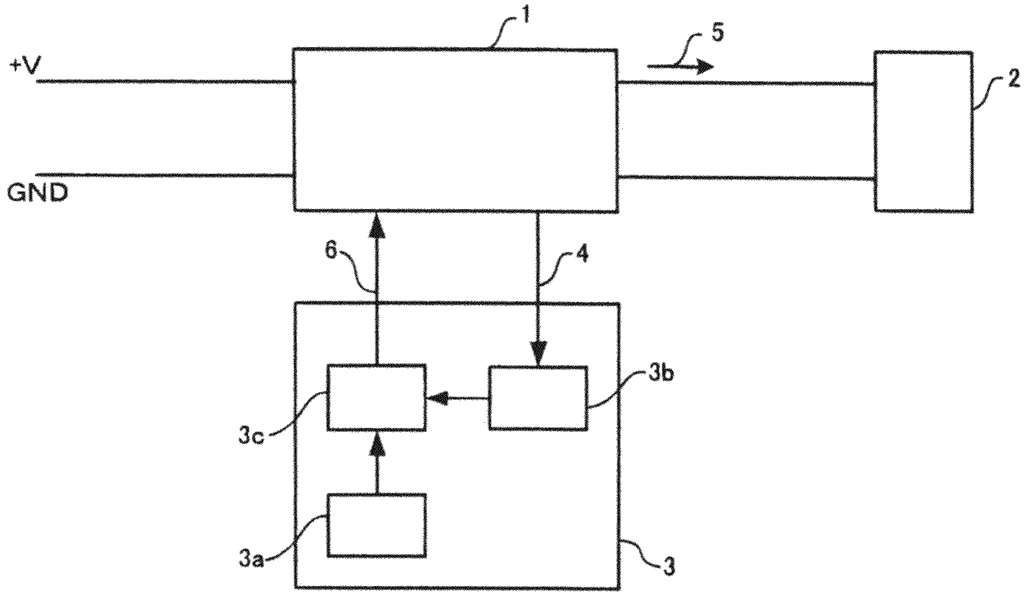
FIG. 5 PRIOR ART
FIG. 5 is a block diagram that depicts a basic configuration of a conventional vehicle lighting device.
Figure 6:
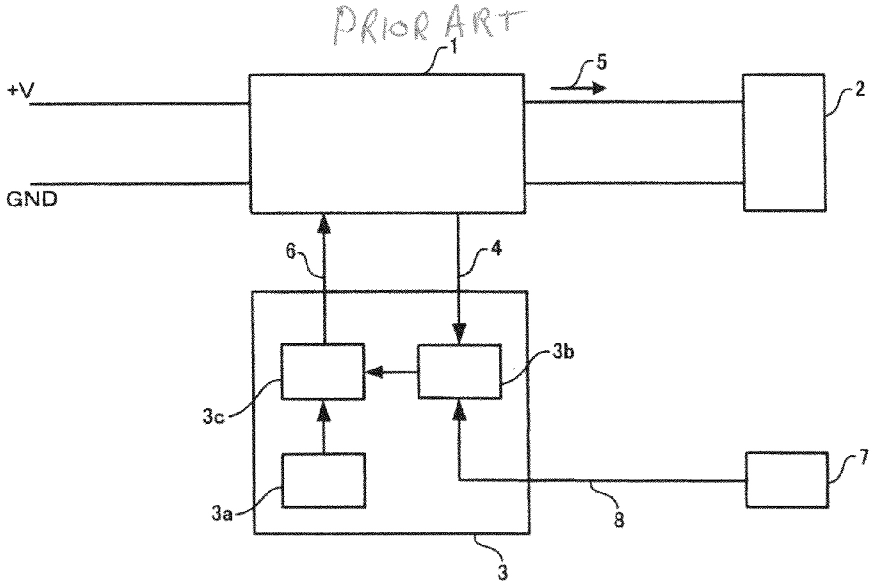
FIG. 6 PRIOR ART
FIG. 6 is a block diagram that depicts an example of the conventional vehicle lighting device.
Figure 7:
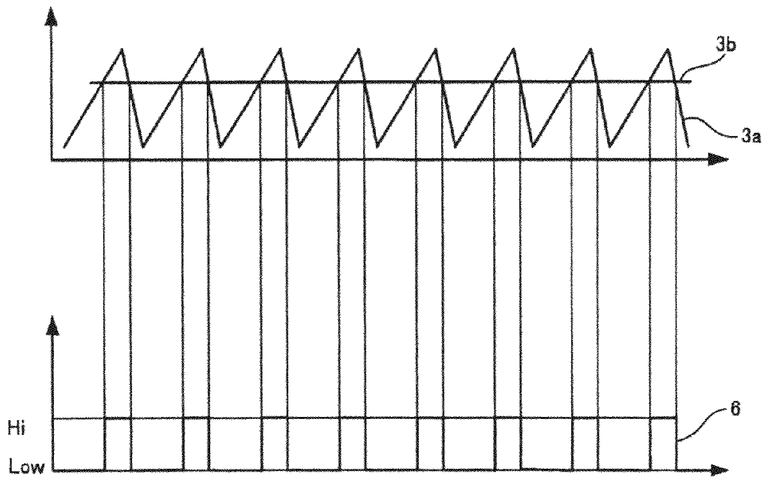
FIG. 7 is a timing chart that depicts generation of a conventional output adjusting signal.

Next, an explanation will be made of the coil current IL flowing in the coil 20 in the embodiment with reference to FIG. 4. An upper part of FIG. 4 depicts the output adjusting signal 6 at the time of the large rank, that is, at the time the output current is set as large, and a change in coil current IL in response to driving the switching element 30 by this signal. This is similar to the timing chart that is depicted in the upper part and the middle part of FIG. 8(*b*) explained in the conventional example.

A lower part of FIG. 4 depicts a change in coil current IL in response of driving the switching element 30 by the output adjusting signal 6 in response to the small rank, that is, at the time the output current is set as small. As described above, a driving frequency at the time of the large rank is 300 kHz, a driving frequency at the time of the small rank is 500 kHz, and, as depicted in the figure, the driving frequency of the output adjusting frequency 6 at the time of the small rank is larger than the frequency at the time of the large rank.

As already explained, the inclination of increase/decrease with the change in coil current IL is constant since the inductance of the coil 20 is fixed, and in the conventional example, there are some cases where at the time the output current is set as small, the coil current IL is reduced to less than 0 A. As depicted in FIG. 4, however, in the embodiment since the driving frequency of the switching element 30 is compressed at the time the output current is set as small, the next output adjusting signal 6 drives the switching element 30 before the coil current IL is reduced to less than 0 A, and there is no possibility that the coil current IL is reduced to less than 0 A.

While the present invention has been described by way of the embodiment, it is a matter of course that the technical scope of the present invention is not limited to the subject matter described in the foregoing embodiment. It is self-evident to persons skilled in the art that various modifications or alterations can be added to the foregoing embodiment. In addition, it is evident from the subject matter of the claims that a mode for which such modifications or alterations have been made can also be encompassed in the technical scope of the present invention. For example, the present invention includes other embodiments as follows.

In the vehicle lighting device in the foregoing embodiment, the power conversion component includes the function of the pressure-increasing DC-DC converter, hut the vehicle lighting device in the present invention is not limited thereto. For example, the vehicle lighting device in the present invention may employ a power conversion component including a function of a pressure-decreasing DC-DC converter or a pressure-increasing/decreasing DC-DC converter.

In the vehicle lighting device in the foregoing embodiment, the output current setting device changes the plurality of resistors, hut is not limited thereto. For example, the changing of the switch may be made by directly supplying a voltage from the DC power source or by writing in programs in a manufacturing factory. The output current setting device may be an external element (resistor) that is supplied together with an output circuit and an LED. In addition, the frequency of the triangle wave generator may be adjusted employing communications.

What is claimed is:

1. A vehicle lighting device comprising:

a load that is operable by a current;

a power conversion component configured to convert a direct-current power that is inputted and to supply the converted output current for output to the load, and to output an output current signal based upon the output current;

an output current setting device configured to output a set output current setting signal;

a frequency adjusting component configured to output a frequency signal of a frequency based upon the output current setting signal that is inputted;

an output current detecting component configured to compare a reference voltage based upon a voltage generated and the output current signal, employing the output current setting signal that is inputted, and to output a signal voltage;

an output adjusting-signal generating component configured to compare the frequency signal and the signal voltage that are inputted, and to output an output adjusting signal;

an output control component configured to supply the output adjusting signal to the power conversion component, wherein the frequency adjusting component is configured to set a low frequency in a case where the output current is set as large, and to set a high frequency in a case where the output current is set as small; and switch changing components each configured to provide an ON or OFF signal based on the output current setting signal, wherein the frequency adjusting component is configured to set a frequency based on frequency changing switches of the frequency adjusting component which are set based on the ON or OFF signals from respective of the switch changing components.

2. The vehicle lighting device according to claim 1, wherein the load includes a light emitting element that emits a luminous flux that is set from a plurality of ranks in accordance with a plurality of predetermined luminous fluxes, the power conversion component includes a coil having a predetermined inductance, and a switching element configured to change a coil current flowing in the coil by a switching operation to be converted to the output current, the output current setting device is configured to set the output current setting signal to correspond to the set luminous flux, the frequency adjusting component is configured to output a frequency signal of a frequency based upon the output current setting signal in accordance with the set luminous flux, the output current detecting component configured to set the reference voltage employing the output current setting signal in accordance with the set luminous flux, and to compare the reference voltage with the output current signal, and to output a signal voltage, and the output adjusting-signal generating component configured to compare the frequency signal with the signal voltage, and to output the output adjusting signal, and to drive the switching element in such a manner that the output adjusting signal outputs the output current in accordance with the light emitting element.

3. The vehicle lighting device according to claim 1, wherein the frequency signal includes a triangle wave.

4. The vehicle lighting device according to claim 2, wherein the frequency adjusting signal drives the switching element in such a manner that the coil current is not reduced to less than OA in a case where the output current is set as small.

5. The vehicle lighting device according to claim 2, wherein the light emitting element includes an LED.

6. The vehicle lighting device according to claim 1, wherein the frequency adjusting component is configured to set a highest frequency when the switch changing components all provide an ON signal, and to set a lowest frequency when the switch changing components all provide an OFF signal.

* * * * *